United States Patent [19]

Nishikawa et al.

[11] Patent Number: 4,484,757

[45] Date of Patent: Nov. 27, 1984

[54] MOBILE SUBSTATION

[75] Inventors: Akira Nishikawa, Nara; Shinichi Okazaki, Kawanishi, both of Japan

[73] Assignee: Mitsubishi Denki Kabushiki Kaisha, Japan

[21] Appl. No.: 440,595

[22] Filed: Nov. 10, 1982

[30] Foreign Application Priority Data

Nov. 24, 1981 [JP] Japan ............................ 56-188592

[51] Int. Cl.$^3$ .............................................. B62D 53/04
[52] U.S. Cl. .................................................. 280/423 R
[58] Field of Search ............... 280/423 R, 81 R, 81 B, 280/98; 187/9 E

[56] References Cited

U.S. PATENT DOCUMENTS

| | | | |
|---|---|---|---|
| 2,418,090 | 3/1947 | Nunes | 280/98 |
| 2,982,563 | 5/1961 | Gregg | 280/81 R |
| 3,721,358 | 3/1973 | Brock | 280/423 R |
| 3,830,342 | 8/1974 | Allen | 187/9 E |
| 4,111,451 | 9/1978 | Pinto | 280/423 R |
| 4,375,892 | 3/1983 | Jenkins et al. | 280/81 R |

OTHER PUBLICATIONS

"Lightweight Mobile Substation May Now Travel The Highways", Transmission & Distribution, p. 31, Nov. 1980.

Primary Examiner—Joseph F. Peters, Jr.
Assistant Examiner—Kenneth R. Rice
Attorney, Agent, or Firm—Leydig, Voit, Osann, Mayer and Holt, Ltd.

[57] ABSTRACT

The present invention relates to a mobile substation comprising a chassis on which substation equipment are carried, king pins which are respectively fixed at both end parts of the chassis, a tractor which includes a coupler adapted to detachably couple to either of the king pins and which supports one of the end parts of the chassis, a bogie truck which includes a coupler adapted to detachably couple to the other king pin and which supports the other end part of the chassis, and supporting legs which are respectively disposed at both the end parts of the chassis and which support the chassis when the chassis is being attached to and detached from the couplers of the tractor and the truck.

3 Claims, 6 Drawing Figures

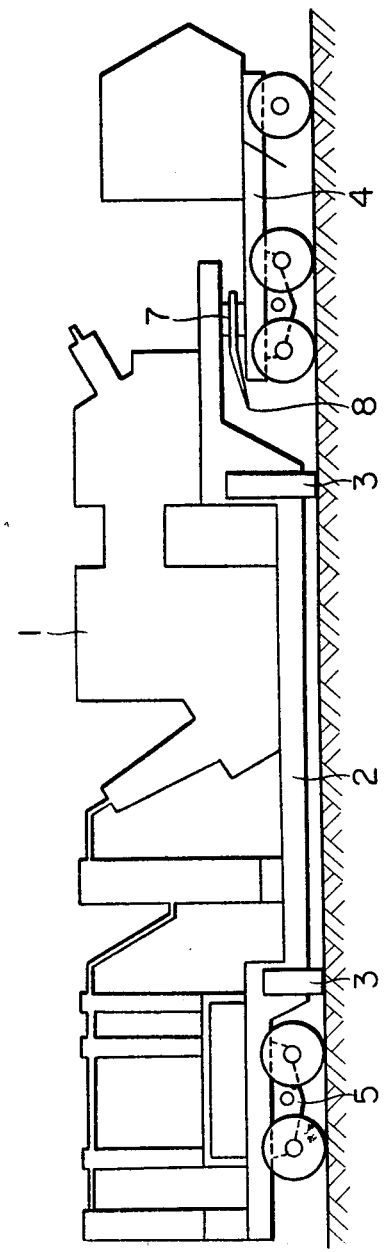
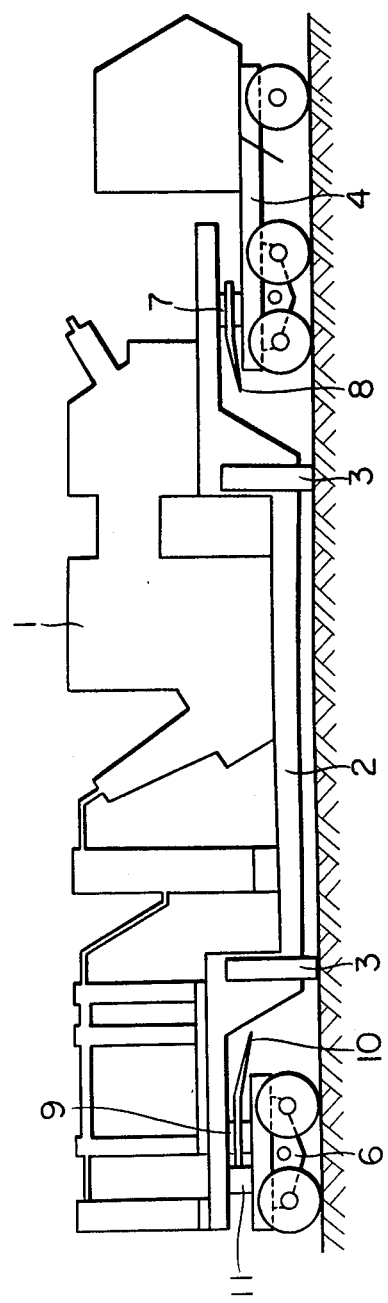

MOBILE SUBSTATION

BACKGROUND OF THE INVENTION

This invention relates to a mobile substation.

Conventional mobile substations usually employ a system wherein equipment constituting the substation is carried on a semi-trailer, which is drawn by a tractor. After the semi-trailer carrying the substation equipment has been installed at a predetermined site, the tractor can be detached.

FIG. 1 illustrates the whole aspect of a mobile substation in which a semi-trailer carrying substation equipment is drawn by a tractor. A chassis 2, on which substation equipment 1 is carried and to which extensible supporting legs 3, driven wheels 5 and a king pin 7 are fixed, has its one end supported through the king pin 7 by a tractor 4 on which a coupler 8 is mounted. In case of installing the substation on a predetermined site, the supporting legs 3 are extended to fix and support the chassis 2 on the ground, whereupon the king pin 7 is released from the coupler 8 so as to detach the tractor 4 from the chassis 2.

The semi-trailer, in which the driven wheels 5 are mounted on the chassis 2 as described above, cannot make a small turn when changing its course during transportation and requires much effort for installation on a site at a small area. Another disadvantage is that maintenance of the driven wheels 5 mounted on the chassis 2 is required.

SUMMARY OF THE INVENTION

This invention has been made in order to eliminate the disadvantages mentioned above, and consists in a construction wherein one end of a chassis carrying substation equipment thereon is supported by a tractor, while the other end is supported by a turnable bogie truck, and wherein after the chassis has been installed at a predetermined site, the tractor and the bogie truck can be detached from the chassis, whereby the mobility of the mobile substation is enhanced, and the maintenance is facilitated.

BRIEF DESCRIPTION OF THE DRAWINGS

FIG. 1 is a compositional diagram showing a prior-art mobile substation;

FIG. 2 is a compositional diagram showing an embodiment of this invention;

In the drawings, the same symbols indicate the same or corresponging parts.

DESCRIPTION OF THE PREFERRED EMBODIMENT

Figure 3:
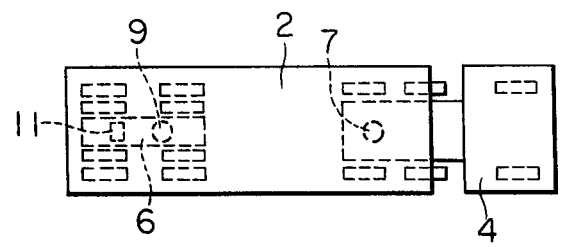
FIG. 3 is a diagram of the running state of the embodiment.

An embodiment of this invention will now be described with reference to FIG. 2. In the figure, a chassis 2 which carries substation equipment 1 has extensible, supporting legs 3 and king pins 7, 9 fixed thereto. One end of the chassis 2 is supported through the king pin 7 by a tractor 4 on which a coupler 8 is mounted, while the other end is supported through the king pin 9 by a bogie truck 6 on which a coupler 10 and a locking device 11 are mounted, the latter permitting the bogie truck to be lockedly fixed in a position ranging from that in which the center lines of the bogie truck and the chassis are parallel to each other to that in which the center lines are perpendicular to each other. Both the tractor 4 and the bogie truck 6 are so constructed as to be detachable from either king pin 7 or 9. That is, the chassis 2 for carrying the substation equipment 1 thereon has the king pins 7 and 9 fixed thereto, and the tractor 4 can be coupled to the chassis 2 in a manner to be turnable about the king pin 7, while the bogie truck 6 can be coupled to the chassis 2 in a manner to be turnable about the king pin 9.

The ordinary transportation state of the mobile substation constructed as described above is illustrated in FIG. 3. Referring to the figure, the bogie truck 6 is fixed to the chassis 2 by the locking device 11 in a position parallel to the chassis 2, and such structure can run in the same aspect as that of the foregoing semi-trailer which is drawn by the tractor.

Figure 4:
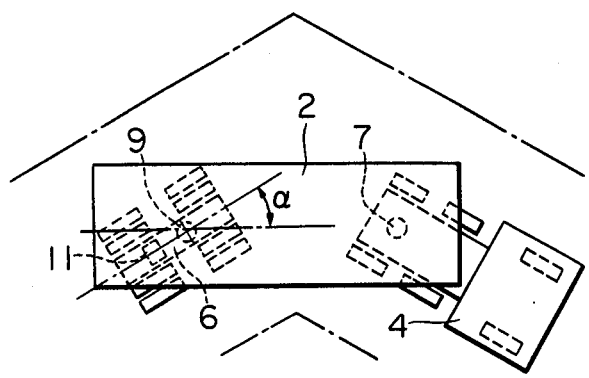
FIG. 4 is a conditional diagram showing the condition in which a bogie truck has been turned.

Next, FIG. 4 illustrates the transportation state of the mobile substation in a narrow place. The bogie truck 6 turnable about the king pin 9 is turned by an angle which is defined by two center lines; the center line of the chassis 2, and the center line of the bogie truck 6 corresponding to a direction tangential to the radius of gyration at the central point of the king pin 9. Then, it is fixed to the chassis 2 by the locking device 11. In this way, the mobile substation becomes capable of a small sharp turn and can be readily transported.

Figure 5:
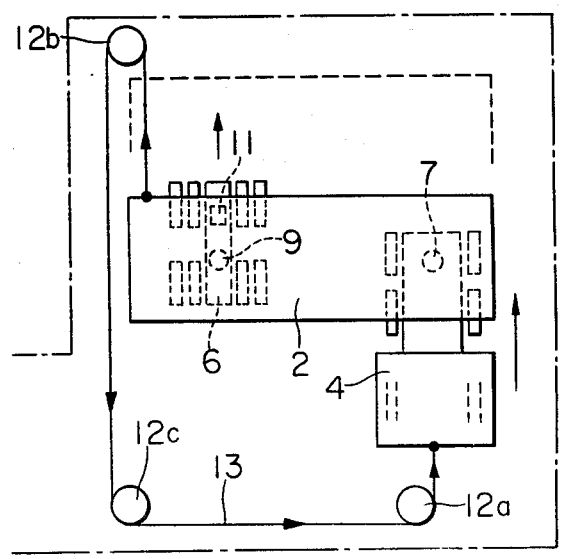
FIG. 5 is a conditional diagram in a case where the bogie truck is turned at right angles to a chassis and then moved by the use of block and tackle.

FIG. 5 illustrates an example in the case where the chassis 2 is moved in a direction perpendicular to its axis. After the bogie truck 6 has been turned about the king pin 9 to a position perpendicular to the chassis 2, it is fixed to the chassis 2 by the locking device 11. The tractor 4 is coupled to the king pin 7 so that it is parallel to the bogie truck 6. The bogie truck 6 and the tractor 4 are coupled to each other by a traction cable 13 through three blocks 12a, 12b, 12c. More specifically, one end of the traction cable 13 is clamped to the fore head part of the tractor 4, while the other end is clamped to the end of the chassis 2 on the side of the bogie truck 6. The three blocks 12a, 12b, 12c are disposed in a manner to be fixed to the ground, at the three points 12a in a position in front of the tractor 4, 12b in a position to the rear of the chassis 2 on the side of the bogie truck 6 in a predetermined position to which the chassis 2 is to be moved, and 12c at position adapted to form a triangle whose one side is a straight line connecting the preceding two points as shown in FIG. 5. After the blocks 12a, 12b, 12c have been arranged in this fashion, the traction cable 13 is stretched tight. When the tractor 4 is reversed in the direction of the arrow, the traction cable 13, drawn in the direction of arrows through the three blocks 12a, 12b, 12c by the movement of the tractor 4, functions to move the bogie truck 6 in the direction of the arrow at the point fixed to the chassis 2 beside the bogie truck 6. With the continuous movement of the tractor 4, the bogie truck 6 is also moved continuously in the same direction as that of the tractor 4. Accordingly, the chassis 2 can be readily transported into the predetermined position. In case of dismantling the mobile substation, the bogie truck 6 is coupled to the king pin 7, while the tractor 4 is coupled to the king pin 9, and the blocks 12a, 12b, 12c are arranged conversely to the state of FIG. 5. Thus, the mobile substation can be dismantled with just an easy change of direction.

Figure 6:
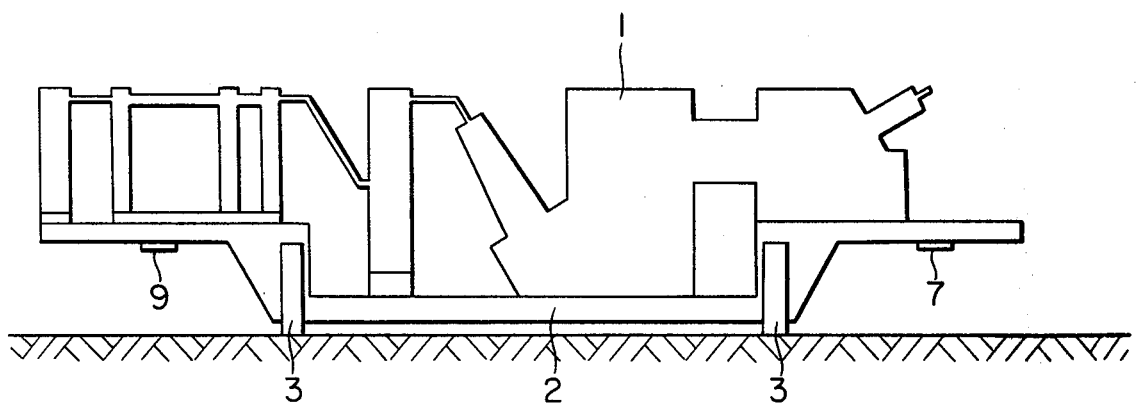
FIG. 6 is a compositional diagram of the installed state of a mobile substation equipped with the bogie truck.

FIG. 6 shows the state in which the mobile substation has been installed with the tractor 4 and the bogie truck 6 detached. Only the king pins 7, 9 and the supporting legs 3 are left in the chassis 2 carrying the substation equipment 1, so that the maintenance operations on the devices on which chassis 2 is mounted can be readily performed.

What is claimed is:

1. A mobile substation comprising a chassis on which substation equipment is carried; king pins which are respectively fixed at both end parts of said chassis; a tractor which includes a coupler that is detachably coupled to either of said king pins and which supports one of said end parts of said chassis; a bogie truck which includes a coupler that is detachably coupled to the other king pin and which supports the other end part of said chassis, said bogie truck also being provided with a locking device which fixes said bogie truck against turning about said king pin of said chassis, said locking device permitting said bogie truck to be lockedly fixed in a position ranging from that in which the centerlines of said bogie truck and said chassis are parallel to each other to that in which said centerlines are perpendicular to each other; and supporting legs which are respectively disposed at said both end parts of said chassis and which support said chassis when said chassis is being attached to or detached from said couplers of said tractor and said bogie truck.

2. A mobile substation comprising a chassis on which substation equipment is carried; king pins which are respectively fixed at both end parts of said chassis; a tractor which includes a coupler that is detachably coupled to either of said king pins and which supports one of said end parts of said chassis; a bogie truck which includes a coupler that is detachably coupled to the other king pin and which supports the other end part of said chassis; supporting legs which are respectively disposed at said both end parts of said chassis and which support said chassis when said chassis is being attached to or detached from said couplers of said tractor and said bogie truck; and means for moving said chassis orthogonally to its lengthwise direction comprising a traction cable which couples said chassis and said tractor to each other through blocks.

3. A mobile substation according to claim 2 wherein one end of said traction cable is secured to the fore head part of the tractor and the other end of said traction cable is secured to a side of said chassis adjacent said bogie truck.

* * * * *